(12) United States Patent
Lee et al.

(10) Patent No.: US 11,538,441 B2
(45) Date of Patent: Dec. 27, 2022

(54) TILED DISPLAY AND IMAGE CORRECTION METHOD

(71) Applicant: SAMSUNG DISPLAY CO., LTD., Yongin-si (KR)

(72) Inventors: Suk Hun Lee, Suwon-si (KR); Chae Hee Park, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/496,669

(22) Filed: Oct. 7, 2021

(65) Prior Publication Data

US 2022/0208143 A1    Jun. 30, 2022

(30) Foreign Application Priority Data

Dec. 28, 2020   (KR) .......................... 10-2020-0184723

(51) Int. Cl.
G09G 5/10    (2006.01)

(52) U.S. Cl.
CPC ......... G09G 5/10 (2013.01); *G09G 2300/026* (2013.01); *G09G 2310/0232* (2013.01)

(58) Field of Classification Search
CPC ............... G09G 5/10; G09G 2300/026; G09G 2310/0232; G06F 3/1446; G09F 9/3023
See application file for complete search history.

(56) References Cited

U.S. PATENT DOCUMENTS

| | | | |
|---|---|---|---|
| 9,134,950 B2 * | 9/2015 | Choi ...................... | G06F 3/1446 |
| 9,529,563 B2 * | 12/2016 | Kazmierski ........... | G06F 3/1446 |
| 10,043,463 B2 | 8/2018 | Hwang et al. | |
| 10,935,828 B2 | 3/2021 | Jeong et al. | |
| 11,056,067 B2 * | 7/2021 | Jun ....................... | G09G 3/3688 |
| 2011/0298763 A1 * | 12/2011 | Mahajan ................ | G09G 3/025 |
| | | | 345/1.3 |
| 2016/0163018 A1 * | 6/2016 | Wang ..................... | G06F 3/1423 |
| | | | 345/504 |
| 2018/0040271 A1 * | 2/2018 | Jung ..................... | G09G 3/2007 |
| 2020/0211155 A1 * | 7/2020 | Ma ........................ | G06T 7/32 |
| 2020/0251048 A1 * | 8/2020 | Im .......................... | H05B 45/30 |
| 2021/0020124 A1 * | 1/2021 | Kenmochi ............ | G06F 3/1446 |

FOREIGN PATENT DOCUMENTS

| | | |
|---|---|---|
| KR | 10-0510650 | 8/2005 |
| KR | 10-0902013 | 6/2009 |
| KR | 10-1157425 | 6/2012 |
| KR | 10-1182779 | 9/2012 |
| KR | 10-1205210 | 11/2012 |
| KR | 10-1632572 | 7/2016 |
| KR | 10-2017-0070333 | 6/2017 |
| KR | 10-2018-0067884 | 6/2018 |
| KR | 10-2018-0079080 | 7/2018 |
| KR | 10-2019-0000649 | 1/2019 |
| KR | 10-2019-0079283 | 7/2019 |

* cited by examiner

*Primary Examiner* — Antonio Xavier
(74) *Attorney, Agent, or Firm* — H.C. Park & Associates, PLC

(57) ABSTRACT

A tiled display includes a plurality of display devices respectively including a plurality of pixels, and a main controller that processes an input image signal to provide an image signal to the plurality of display devices. Based on distance data between adjacent display devices among the plurality of display devices, the main controller generates a corrected image signal that increases luminance near a boundary portion of the adjacent display devices.

16 Claims, 9 Drawing Sheets

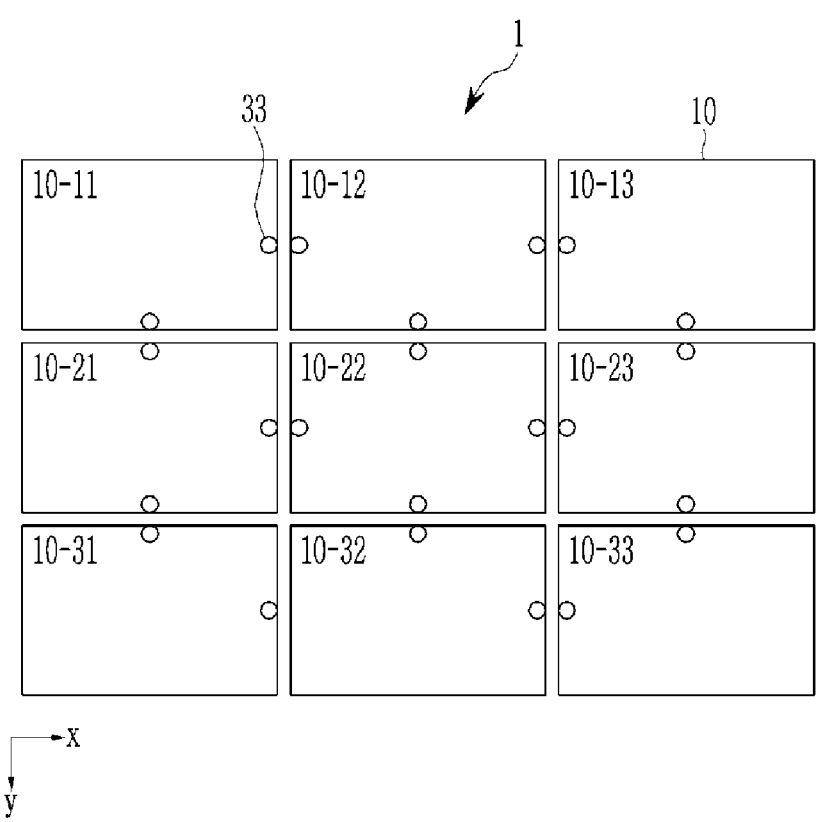

TILED DISPLAY AND IMAGE CORRECTION METHOD

CROSS-REFERENCE TO RELATED APPLICATION

This application claims priority from and the benefit of Korean Patent Application No. 10-2020-0184723, filed on Dec. 28, 2020, which is hereby incorporated by reference for all purposes as if fully set forth herein.

BACKGROUND

Field

Embodiments of the invention relate generally to a tiled display and an image correction method.

DISCUSSION OF THE BACKGROUND

As a device for displaying an image, a display device such as a light emitting display or a liquid crystal display is used. There is a limit to a size of a screen that one display device may provide. Accordingly, a tiled display has been developed that implements a large screen by disposing or connecting a plurality of display devices to be adjacent to each other. The tiled display is being used for expositions, exhibitions, event halls, performance halls, and outdoor advertisements.

However, in the tiled display, a boundary portion of adjacent display panels may be viewed, and an entire screen may be discontinuously recognized.

The above information disclosed in this Background section is only for understanding of the background of the inventive concepts, and, therefore it may contain information that does not constitute prior art.

SUMMARY

Embodiments are to provide a tiled display and an image correction method that may improve visual recognition of a boundary portion.

Additional features of the inventive concepts will be set forth in the description which follows, and in part will be apparent from the description, or may be learned by practice of the inventive concepts.

An embodiment provides a tiled display including a plurality of display devices respectively including a plurality of pixels, and a main controller that processes an input image signal to provide an image signal to the plurality of display devices. Based on distance data between adjacent display devices among the plurality of display devices, the main controller generates a corrected image signal that increases luminance near a boundary portion of the adjacent display devices.

The distance data is based on a distance between adjacent pixels in the adjacent display devices or a distance between outermost portions of the adjacent display devices.

The main controller may generate the corrected image signal when a distance provided by the distance data is within a predetermined value, and may generate a normal image signal when the distance provided by the distance data is outside of the predetermined value.

Even if the distance is within the predetermined value, when a black image is displayed near the boundary portion, the main controller may generate a normal image signal.

Increasing luminance near the boundary portion may include increasing luminance of one or more pixel rows or pixel columns adjacent to the boundary portion.

Increasing luminance near the boundary portion may include gradually increasing luminance of a plurality of pixel rows or pixel columns adjacent to the boundary portion toward the boundary portion.

The tiled display may further include a distance measurer generating distance data between the plurality of display devices to provide the distance data to the main controller.

The distance measurer may include a plurality of sensors respectively disposed in the plurality of display devices.

The plurality of sensors may include a main sensor disposed in one of the plurality of display devices and a sub-sensor disposed at remaining display devices of the plurality of display devices, and the main sensor may measure a distance to the sub-sensor to generate the distance data.

The distance measurer may generate off-center distance data between a central display device disposed at a center of the plurality of display devices and display devices surrounding the central display device, and the main controller may generate the corrected image signal based on the distance data and the off-center distance data.

Another embodiment provides an image correction method of a tiled display including a plurality of display devices, including generating distance data between adjacent display devices among the plurality of display devices; generating a corrected image signal that increases luminance near a boundary portion of the adjacent display device, based on an input image signal and the distance data; and displaying a corrected image with increased luminance near the boundary portion according to the corrected image signal.

The distance data may be generated based on a distance between adjacent pixels in the adjacent display devices or a distance between outermost portions of the adjacent display devices.

The corrected image signal may generate the corrected image signal when a distance provided by the distance data is within a predetermined value.

Even if the distance is within the predetermined value, when a black image is displayed near the boundary portion, a normal image signal may be generated.

The displaying of the corrected image may include increasing luminance of one or more pixel rows or pixel columns adjacent to the boundary portion.

The displaying of the corrected image may include gradually increasing luminance of a plurality of pixel rows or pixel columns adjacent to the boundary portion toward the boundary portion.

The generating of the distance data may include measuring a distance between a plurality of sensors respectively disposed in the plurality of display devices.

The generating of the distance data may include measuring a distance between a plurality of sub-sensors disposed in the plurality of display devices and a main sensor disposed outside the tiled display.

The image correction method may further include generating off-center distance data between a central display device disposed at a center among a plurality of display devices and display devices surrounding the central display device. The corrected image signal may be generated based on the input image signal, the distance data, and the off-center distance data.

The tiled display may display a corrected image in which luminance near the boundary portion is increased and luminance of a central portion of the tiled display is increased according to the corrected image signal.

According to the embodiment, it is possible to improve visual recognition of a boundary in a tiled display. Further, according to the embodiments, there is an advantageous effect that may be recognized throughout the present specification.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

FIGS. 3A, 3B, and 4 respectively illustrate a schematic view of a tiled display according to embodiments described herein.

DETAILED DESCRIPTION

Figure 1:
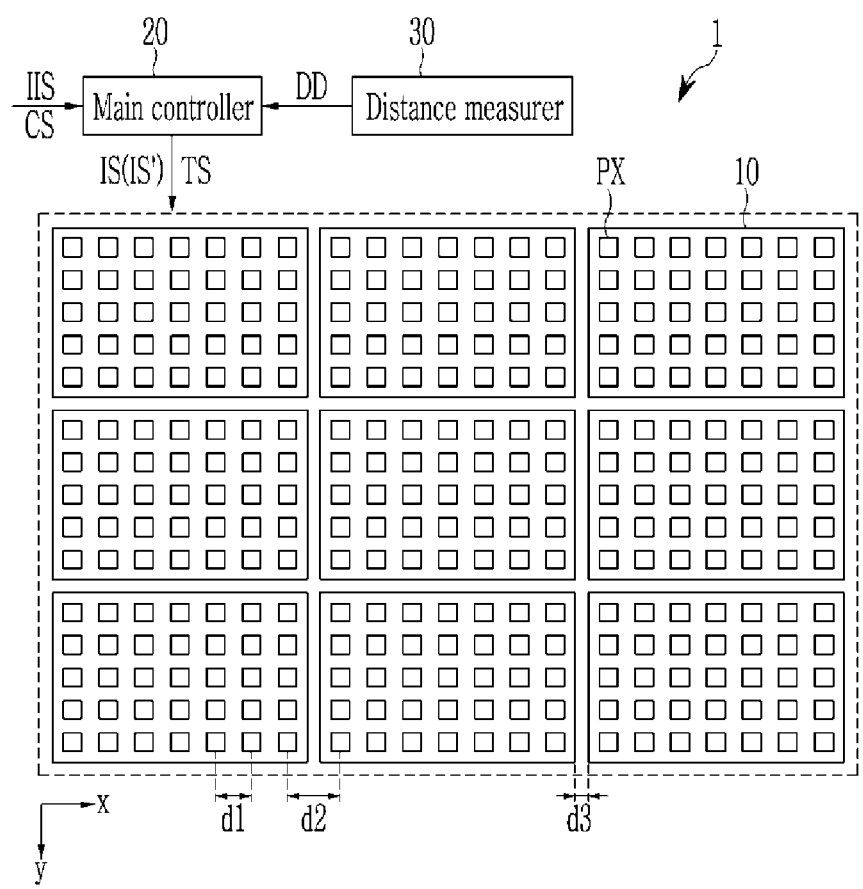
FIG. 1 illustrates a schematic view of a tiled display according to embodiments described herein.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are illustrated in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

The inventive concept will be described more fully hereinafter with reference to the accompanying drawings, in which embodiments of the inventive concept are illustrated.

Figure 2:
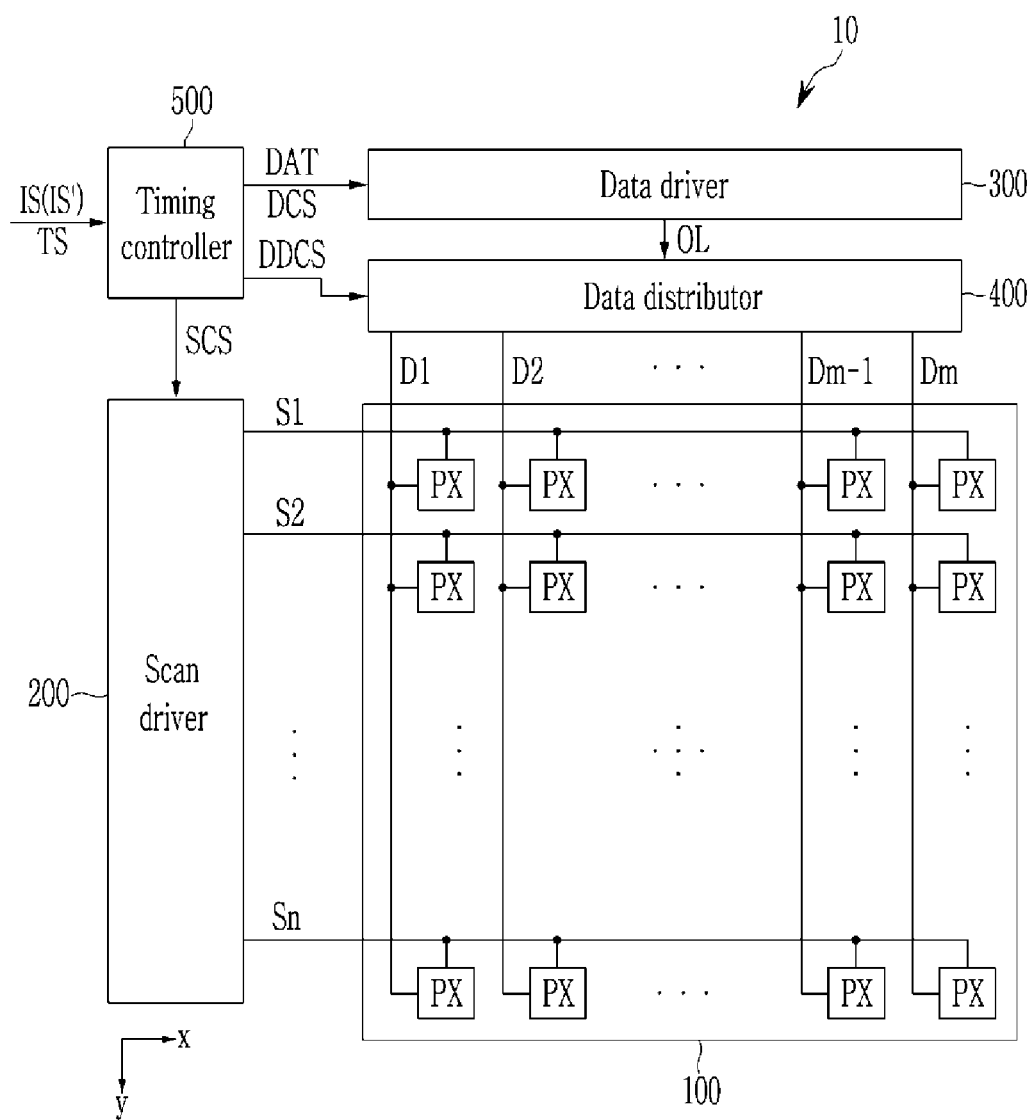
FIG. 2 illustrates a block diagram of a display device included in the tiled display of FIG. 1.

FIG. 1 illustrates a schematic view of a tiled display according to an embodiment, and FIG. 2 illustrates a block diagram of a display device included in the tiled display of FIG. 1.

Referring to FIG. 1, a tiled display 1 includes a plurality of display devices 10 and a main controller 20.

The display devices 10 may be disposed or connected to be adjacent to each other. FIG. 1 illustrates that a 3×3 matrix of display devices 10 are disposed, but the number and disposition of display devices 10 may be variously changed. Sizes of the display devices 10 may be the same or different. An overall screen of the tiled display 1 may be flat or curved. When the screen of the tiled display 1 is curved, a screen of each display device 10 may also be curved.

Each display device 10 includes pixels PX. The pixels PX may implement a screen in which an image is displayed. The screens of respective display devices 10 may be combined to form the screen of the tiled display 1. Accordingly, a size of the screen of the tiled display 1 may be defined by a size of the screen of the display device 10 and the number of the display devices 10 connected together or adjacent each other.

The pixels PX may be arranged in a matrix format. A pixel row may be pixels PX arranged in a line in a first direction x, and a pixel column may be pixels PX arranged in a line in a second direction y. Each display device 10 may display a divided image by a combination of pixels PX. Due to a bezel (outer edge) of the display device 10, a distance d2 between adjacent pixels PX in adjacent display devices 10 may be larger than a distance d1 between adjacent pixels PX in each display device 10. For this reason, because pixels PX in the bezel area are not disposed at a boundary portion of the adjacent display devices 10, the boundary portion may be darkly viewed compared with other areas having pixels PX, and the boundary portions of the display devices 10 may be viewed like a window frame in the illustrated tiled display 1.

The main controller 20 may receive and process an input image signal IIS and a control signal CS thereof from an external device (for example, a graphics chip) to provide an image signal IS to respective display devices 10. The input image signal IIS may be a signal for one entire image displayed by the tiled display 1, and the main controller 20 may produce the image signal IS for a divided image displayed by each display device 10, which is obtained by dividing one entire image or a plurality of images. Accordingly, each display device 10 may individually receive the image signal IS to display a divided image. The entire image or images displayed on the tiled display 1 may be displayed by combining the divided images displayed by respective display devices 10. The image signals IS provided to respective display devices 10 may be different. When the tiled display 1 includes n number of display devices 10, the main controller 20 may generate n number of image signals IS to provide them to the corresponding display devices 10.

The main controller 20 may receive distance data DD between adjacent display devices 10 from a distance measurer 30 to generate and output a corrected image signal IS' according to the distance data DD. Hereinafter, the image signal IS will also be referred to as a normal image signal IS to distinguish it from the corrected image signal IS'.

The distance data DD may include distance information regarding distances between the display devices 10. When a distance provided by the distance data DD between one display device 10 and another is within a predetermined value, the main controller 20 may operate to generate the corrected image signal IS' that may increase luminance near a boundary portion of the adjacent display devices 10 (for example, luminance of one or more pixel columns and/or pixel rows disposed near the boundary portion). For example, the distance provided by the distance data DD may be based on the distance d2 between the adjacent pixels PX in the adjacent display devices 10. When the distance d2 is within a predetermined value, it is possible to improve the boundary portion being viewed by increasing the luminance of the pixels PX on one or opposing display devices 10 near the boundary portion. Accordingly, quality of the entire image displayed by the tiled display 1, which is displayed by a combination of the divided images of the display devices 10, may be improved. The distance provided by the distance data DD may be based on a distance d3 between outermost portions of the adjacent display devices 10.

When the distance provided by the distance data DD exceeds the predetermined value, the main controller 20 may operate to generate the normal image signal IS. For example, when the distance d2 is more than the predetermined value, even if the luminance of the pixels PX near the boundary portion is increased and an edge of each display device 10 is brightly displayed, it may be difficult to improve the boundary portion from being viewed.

When the distance d2 is less than or equal to the predetermined value (for example, when the distance d2 is the same as or is substantially the same as the distance d1 between the adjacent pixels PX in each display device 10), the boundary portion may not be viewed or may be hardly viewed, which are desired configurations. In this case, when the luminance of the pixels PX near the boundary portion is increased, the boundary portion and the image adjacent thereto may be further prominently viewed.

The predetermined value may be changed according to the distance d1, the entire size of the tiled display 1, a distance between a viewer and the tiled display 1, and the like. For example, the predetermined value may be about 1 to about 1000 times, about 1 to about 100 times, or about 1 to about 10 times the distance d1.

The distance measurer 30 may be included in the tiled display 1. The distance measurer 30 may include a part included in the tiled display device 1 and a part provided in the outside.

Meanwhile, the corrected image signal IS', which may be generated based on the distance data DD, may be stored as an image conversion setting value in a storage part (not illustrated). In such a case, the image conversion setting value may be loaded immediately when the distance provided by the distance data DD is within a predetermined value. The image conversion setting value may be stored in a form of a lookup table. The storage part may store various data related to the operation of the main controller 20.

A configuration and operation of one display device 10 will be described with reference to FIG. 2. The display device 10 may include a display panel 100, a scan driver 200, a data driver 300, a data distributor 400, and a timing controller 500.

The display panel 100 may include the pixels PX. The display panel 100 may provide a screen implemented by the pixels PX. The display panel 100 may be a light emitting display panel including a light emitting diode (LED) type or an organic light emitting diode (OLED) type, or a liquid crystal panel including a liquid crystal layer, but there is no limitation as long as the display panel 100 is a display panel capable of displaying an image by a combination of the pixels PX. The display panel 100 may include signal lines such as scan lines S1 to Sn and data lines D1 to Dm. The scan lines S1 to Sn may be connected to the scan driver 200, and the data lines D1 to Dm may be connected to the data distributor 400 and the data driver 300.

The pixels PX may configure pixel rows and pixel columns. The pixel row may refer to a group of pixels connected to a same scan line, and the pixel column may refer to a group of pixels connected to a same data line. The display panel 100 may include m pixel columns and n pixel rows (where m and n are each a positive integer). Respective pixels PX are connected to the scan lines S1 to Sn and the data lines D1 to Dm to receive a gate signal and a data voltage.

The scan driver 200 may generate a scan signal based on a first control signal SCS to apply it to the scan lines S1 to Sn.

The data driver 300 may generate a data voltage based on a second control signal DCS and image data DAT, and may provide the data voltage to the data distributor 400 through output lines OL. The data voltage may correspond to the normal image signal IS or the corrected image signal IS'.

The data distributor 400 may selectively apply (for example, time-division supply) a data signal to the data lines D1 to Dm based on a third control signal DDCS. The data distributor 400 may include demultiplexers. For example, each demultiplexer may transmit the data signal received from the data driver 300 to one of p data lines through p switching transistors (wherein p is an integer greater than or equal to 2). Depending on the type of the tiled display 1, the data distributor 400 may not be included.

The timing controller 500 may receive the image signal IS and a timing signal TS from the main controller 20, and the timing controller 500 may generate the first control signal SCS, the second control signal DCS, the third control signal DDCS, and the image data DAT based on these signals. The timing signal TS may include a horizontal synchronization signal, a vertical synchronization signal, a data enable signal, and a clock signal. When the main controller 20 provides the corrected image signal IS', the timing controller 500 may generate the image data DAT based on the corrected image signal IS'. The timing controller 500 may provide the first control signal SCS to the scan driver 200, the second control signal DCS and the image data DAT to the data driver 300, and the third control signal DDCS to the data distributor 400. The timing controller 500 may be individually provided in respective display devices 10, but may also be integrated into the main controller 20.

Figure 3A:
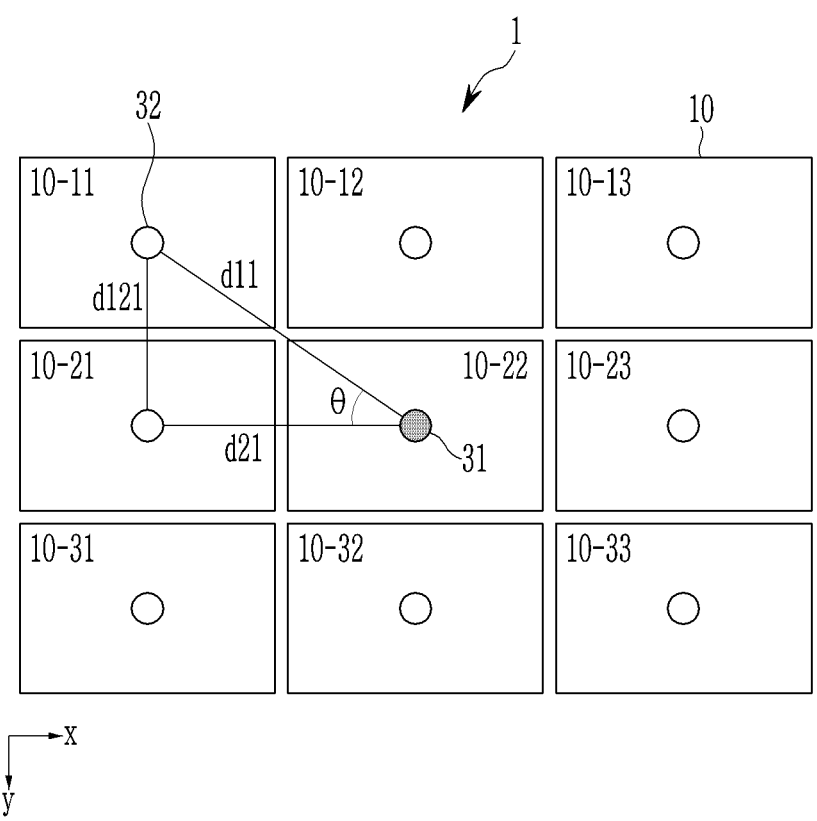
Figure 3B:
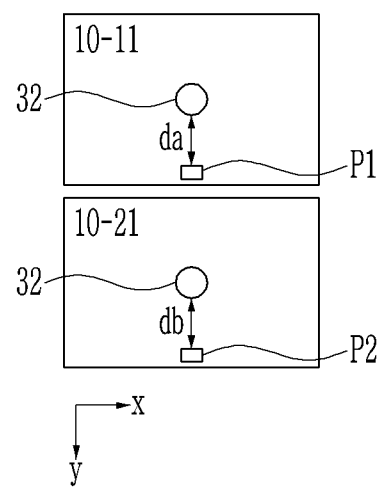

FIGS. 3A, 3B, and 4 respectively illustrate a schematic view of a tiled display according to an embodiment.

FIGS. 3A, 3B, and 4 respectively illustrate the tiled display 1 while mainly illustrating operations of the distance measurer 30 configured to obtain the distance data DD between the display devices 10. In order to distinguish the display devices 10 from one another, for convenience, additional symbols for the display devices 10 are denoted in respective display devices 10.

Referring to FIG. 3A, the distance measurer 30 may include sensors 31 and 32 disposed in each display device 10 of the tiled display 1. Although respective sensors 31 and 32 are illustrated to be disposed approximately at a center of the display device 10, the position of the sensors 31 and 32 is not limited thereto, and they may be disposed at an edge of the display device 10 or at like points within the display devices 10. At least one of the sensors 31 and 32 may be a time of flight (TOF) sensor, but there is no limitation as long as they are sensors that may measure a distance between each other.

At least two sensors may be related as a main sensor and a sub-sensor. For example, one of the sensors 31 and 32 may be a main sensor 31, and the other thereof may be a sub-sensor 32. As illustrated, the main sensor 31 may be provided to a display device 10-22 disposed at a center of the tiled display 1, but may also be provided to a display device 10 disposed elsewhere.

The main sensor 31 may measure a distance to the sub-sensor 32 disposed on each display device 10. Based on the measured distance (for example, d21), the main sensor 31 may directly obtain distances between the display device 10-22 on which it is disposed and the display devices 10-12, 10-21, 10-23, and 10-32 adjacent to the display device 10-22 in the first direction x or the second direction y.

Distances may also be obtained along diagonal lines between the x and y axes. For example, the main sensor may directly obtain distances between the display device 10-22 on which it is disposed and the display devices 10-11, 10-13, 10-31, and 10-33 positioned diagonally therefrom.

A distance (for example, d121) between the display devices 10 in which no main sensor 31 may be obtained from distances (for example, d11 and d21) between the main sensor 31 and the sub-sensors 32 respectively disposed in two display devices 10-11 and 10-21, and an angle (for example, θ) formed by the main sensor 31 and the sub-sensors 32. For example, as illustrated in FIG. 3A, when the main sensor 31 and the two sub-sensors 32 are connected with line segments, a triangle is formed, and in this case, a length of a line segment corresponding to the distance d121 may be obtained from the line segments corresponding to the distance d11 and the distance d21 and the angle θ therebetween using trigonometric calculations in the distance measurer 30. Based on the distance d121 between the sub-sensors 32 of the adjacent display devices 10-11 and 10-21 thus obtained, a distance between adjacent display devices 10 in the first direction x or second direction y may be obtained.

For example, as illustrated in FIG. 3B that illustrates display devices 10-11 and 10-21, when a distance between the sub-sensor 32 and a pixel P1 disposed at an outermost side of the display device 10-11 in the second direction y is da in the display device 10-11, and when a distance between the sub-sensor 32 and the pixel P2 disposed at the outermost side of the display device 10-21 in the second direction y is db in the display device 10-21, a distance between the adjacent pixels PX of the adjacent display devices 10-11 and 10-21 may be calculated as d121−(da+db). That is, the length d121 (minus) the sum of da and db.

Referring to FIG. 4, the distance measurer 30 used in the tiled display 1 may include sub-sensors 33 disposed in each display device 10. The sub-sensors 33 may be magnetic sensors that measure a distance by sensing a change of magnetic force according to a distance between two points, but there is no limit to this type of sensor as long as sensors used may measure a distance therebetween. Each display device 10 may be provided with a plurality of the sub-sensors 33, and the sub-sensors 33 may be disposed at an edge of the display device 10 (for example, an edge thereof facing an adjacent display device 10). When the sub-sensors 33 are disposed as described above, the distance between the adjacent display devices 10 may be directly obtained from the sub-sensors 33 adjacent to respective display devices 10. The distance measurer 30 may further include a main sensor or a distance calculator (not illustrated) that calculates a distance between the display devices 10 based on information obtained from respective sub-sensors 33.

Figure 5:
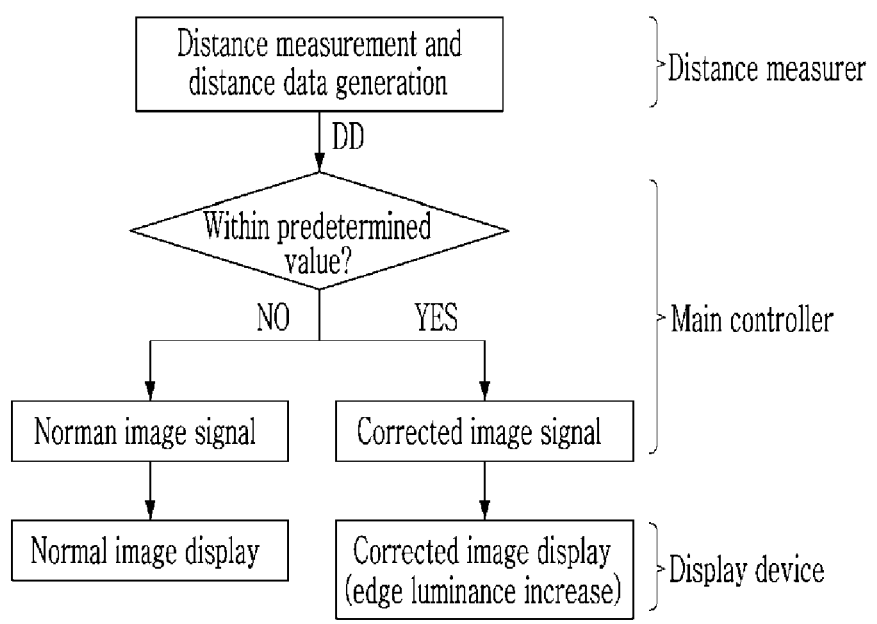
FIG. 5 illustrates a flowchart of an image correction method according to embodiments described herein.

FIG. 5 illustrates a flowchart of an image correction method according to an embodiment.

An image correction method will be described with reference to FIG. 1 to FIG. 4 along with FIG. 5. As described above, by the sensors 31, 32, and 33 provided in each display device 10, the distance measurer 30 may measures the distance between the sensors 31, 32, and 33 in the adjacent display devices 10 to calculate the distance data DD. The distance data DD may be calculated for each pair of display devices 10 adjacent to each other. For example, as illustrated in FIG. 3A, when nine display devices 10 are disposed, at least sixteen pieces of distance data DD may be generated because there are 12 pairs of display devices 10 adjacent in the first direction x or second direction y. The sixteen pieces of distance data may include eight measurements made between the main sensor 31 and sub-sensors 32 illustrated in FIG. 3A, and the eight measurements made between adjacent sub-sensors 33 illustrated in FIG. 4.

The calculated distance data DD may be inputted to the main controller 20. The main controller 20 may generate the normal image signal IS or the corrected image signal IS' according to a distance of a specific part or parts between the adjacent display devices 10 obtained from the distance data DD to provide to the timing controllers 500 of the display devices 10. The main controller 20 may provide the normal image signal IS to all display devices 10 or may provide the corrected image signal IS' to all display devices 10 using the distance data DD. Alternatively, some display devices 10 may provide the normal image signal IS and some other display devices may provide the corrected image signal IS'.

The normal image signal IS may be generated when the distance provided by the distance data DD between the adjacent display devices 10 is not within a predetermined value. The distance and predetermined value may be based on a distance between specific portions (for example, a distance between adjacent pixels, or a distance between outermost portions of display devices) in the adjacent display devices 10.

When the distance d2 between the adjacent pixels PX in the adjacent display devices 10 is not within the predetermined distance, the corrected image signal IS' increasing the luminance of the pixels PX disposed near the boundary portion in the display devices 10 may not be generated.

The corrected image signal IS' may be generated when the distance provided by the distance data DD between the adjacent display devices 10 is within a predetermined value. When the distance provided by the distance data DD is within a predetermined value, for example, when the distance d2 between the adjacent pixels PX in the adjacent display devices 10 is within a predetermined distance, the corrected image signal IS' increasing the luminance of the pixels PX disposed near the boundary portion in the display devices 10 may be generated.

For example, when the distance provided by the distance data DD between the display devices 10-11 and 10-21 in FIG. 3A is within a predetermined value, the corrected image signals IS' increasing the luminance of the pixel rows adjacent to facing edges of the two display devices 10-11 and 10-21 may be provided to the display devices 10-11 and 10-21. The pixel row of which luminance increases may be one or a plurality of pixel rows from the edge thereof. In the same way, when the distance provided by the distance data DD between the display devices 10-22 and 10-23 is within a predetermined value, the corrected image signals IS' increasing the luminance of the pixel columns adjacent to facing edges of the two display devices 10-22 and 10-23 may be provided to the display devices 10-22 and 10-23. The pixel column of which luminance increases may be one or a plurality of pixel columns from the edge thereof. When the distance provided by the distance data DD between the display device 10-22 and the display devices 10-12, 10-21, 10-23, and 10-32 is within a predetermined value, the display device 10-22 may receive the corrected image signal IS' increasing luminance of pixel rows and pixel columns adjacent to four edges thereof.

A degree of increase in luminance and the number of the pixel rows or pixel columns with increasing luminance are set in consideration of a size of the display device 10, a resolution of the display device 10, a distance between the tiled display 1 and a viewer, and a gray scale of the displayed image. In the case of increasing the luminance of a plurality of pixel rows or a plurality of pixel columns, the luminance may be gradually increased toward the edge (boundary portion) of the display device.

The main controller 20 may generate the corrected image signal IS' by applying the above-described luminance increasing algorithm only to display devices 10 in which the distance provided by the distance data DD is within a predetermined value. The main controller 20 may include an image processor (not illustrated) that applies the luminance increasing algorithm to the input image signal IIS based on the distance data DD. Each display device 10 may receive the normal image signal IS or corrected image signal IS' generated based on the distance data DD. The display device 10 provided with the normal image signal IS may display a normal image, and the display device 10 provided with the corrected image signal IS' may display a corrected image having increased luminance at an edge portion (near a boundary portion) thereof.

Also, the corrected image signal IS' may trigger each display device 10 to emit a staggered or graded luminance based on a distance a pixel row or column is from an edge of the display device 10. In one embodiment, rows or columns, such as up to three rows or columns of edge pixels may be programmed to shine brighter than inner pixels, at the boundary area of the display devices 10. Also as noted, the outermost pixels may be configured to shine in a graded fashion. Based on distance measurements, the corrected image signal IS' may program the outermost pixels to shine a luminance, a second row or column one level below, a third row or column another level below, and then the inner pixels programmed all to a same luminance provided by the normal image signal IS, lower than the higher three levels. Such a configuration may be pleasing to a viewer's eyes and blend one display device 10 into another over the boundary region.

Meanwhile, even if the distance provided by the distance data DD is within a predetermined value, when the image displayed by the tiled display 1 is black or a low gray, the main controller 20 may generate and provide the normal image signal IS to all of the display devices 10. When a black or dark image is displayed and when the luminance of the edge of the display device 10 is increased, such a portion may be viewed. Even if the tiled display 1 does not display a black image or a low gray image as a whole, when a portion displayed near the boundary portion of the adjacent display devices 10 is a black or low gray, the main controller 20 may provide the normal image signal IS to the corresponding display devices 10.

Figure 6:
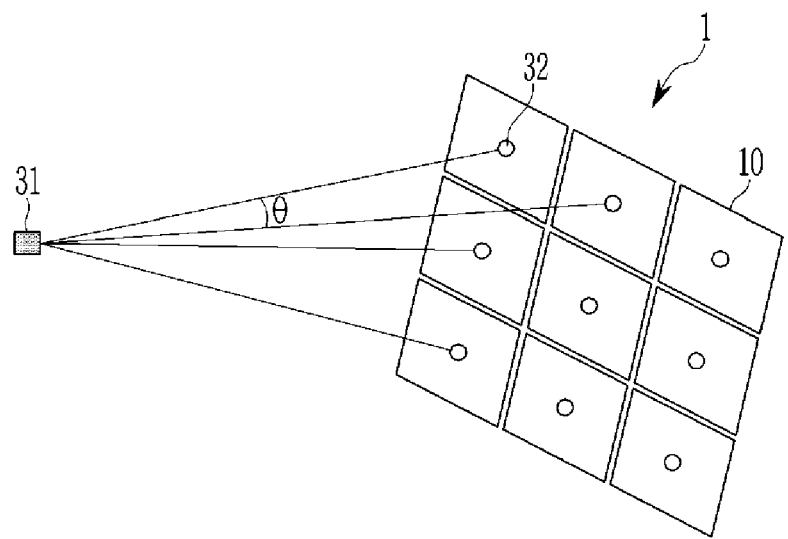
FIG. 6 and FIG. 7 respectively illustrate a schematic view of a tiled display according to embodiments described herein.
Figure 7:
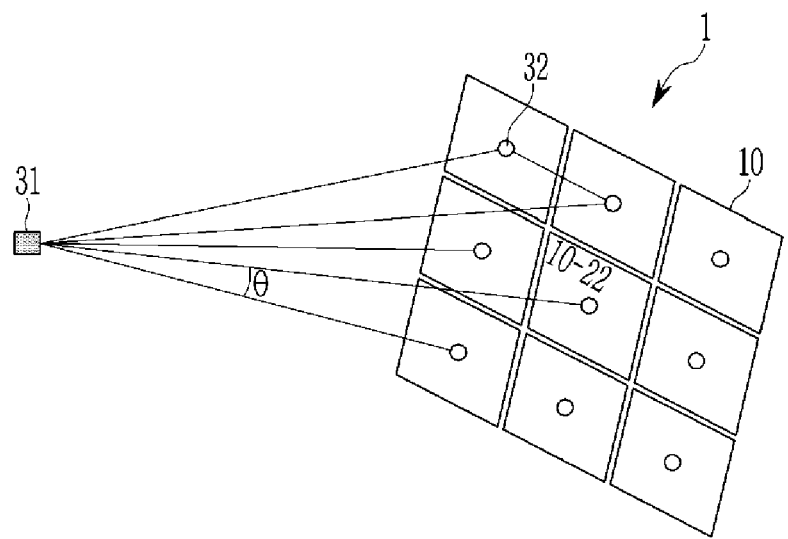

FIG. 6 and FIG. 7 respectively illustrate a schematic view of a tiled display according to an embodiment.

FIG. 6 and FIG. 7 illustrate embodiments in which the main sensor 31 of the distance measurer 30 is disposed at the outside of the tiled display 1.

Referring to FIG. 6, the distance measurer 30 may include the main sensor 31 disposed at the outside of the tiled display 1 and the sub-sensors 32 disposed within respective display devices 10 of the tiled display 1.

The main sensor 31 may be disposed anywhere as long as the distance to the sub-sensors 32 may be measured. The main sensor 31 may measure a distance to each sub-sensor 32 and an angle (θ) formed between two sub-sensors 32 and the main sensor 31 to obtain a distance between the two sub-sensors 32 and to calculate the distance data DD between the display devices 10. A specific method to calculate the distance data DD and a method to generate the corrected image signal IS' based on the distance data DD and displaying the corrected image may be the same as those described above, so redundant descriptions will be omitted.

For example, as illustrated in FIG. 3A, measuring the distances d11 and d21, and the angle θ, using trigonometric functions of a right triangle the distance d121 may be determined. Centers of the main sensor 31 and sub-sensors 32 may be used as reference points when measuring distances. Also, a Cartesian coordinate system using measured distances d11 and d21 may be used to determine the angle θ, and then trigonometric functions may be used to determine the distance d121. The main controller 20 may also include a comparator that may be configured to compare distance d121 obtained by different methods and determine accuracy of a measurement or calculation.

Referring to FIG. 7, the distance measurer 30 may include the main sensor 31 disposed at the outside of the tiled display 1 and the sub-sensors 32 disposed in respective display devices 10 of the tiled display 1. The main sensor 31 may be disposed on a straight line vertically extending from a center of the display device 10-22 disposed at a center of the display devices 10. When the main sensor 31 is disposed as described above, how far the display devices 10 surrounding the display device 10-22 disposed at the center are from the center of the display device 10-22 may be calculated in one of the above-described manners. The obtained distance data (hereinafter, referred to as off-center distance data to distinguish it from the distance data DD between the adjacent display devices 10 described above) may be used to adjust the luminance of the tiled display 1. The main sensor 31 is not disposed at the outside of the tiled display 1, but may be provided at the center of the display device 10-22 disposed at the center as illustrated in the embodiment of FIG. 3A.

Figure 8:
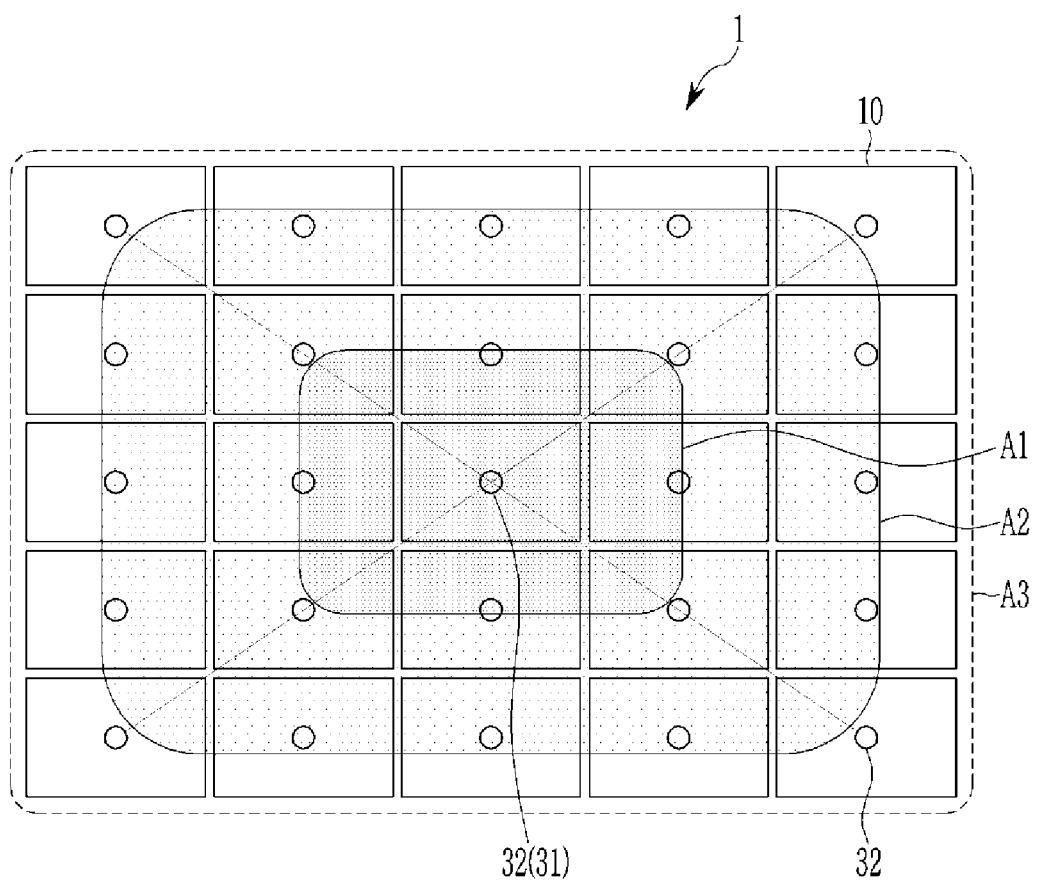
FIG. 8 illustrates a luminance adjustment area in a tiled display according to embodiments described herein.

FIG. 8 illustrates a luminance adjustment area in a tiled display according to an embodiment.

When a viewer watches an image, he (she) may see a center of a screen in more detail. Therefore, in the tiled display 1, when the luminance of the central portion thereof is increased or the luminance of the peripheral portion thereof is decreased, image immersion may be increased. In order to allow the luminance of the central portion of the tiled display 1 to be different from that of the peripheral portion, as the distance from the center of the tiled display 1 increases, the area of the tiled display 1 may be divided into a plurality of areas, and the luminance of each area may be differently controlled.

For example, as illustrated in FIG. 8, the entire area (corresponding to the screen) of the tiled display 1 may be divided into a first area A1, a second area A2 and a third area A3. The main controller 20 may determine which display devices 10 are different distances away from the center of the tiled display 1 through the off-center distance data obtained from the distance measurer 30. Therefore, the main controller 20 may generate the corrected image signal IS' that decreases luminance in the first area A1 disposed in the central portion and increases luminance in the third area A3 disposed farthest from the center based on the off-center distance data to provide it to the corresponding display devices 10. The display device 10 may receive the corrected image signal IS' that overall increases or decreases luminance in given areas, and may receive the corrected image signal IS' that increases or decreases luminance of a specific area and maintains luminance of another specific area.

Because the sub-sensors 32 are provided in each display device 10, even if the arrangement of the display devices 10 is changed when the tiled display 1 is installed, the off-center distance data away from the center of the tiled display 1 may be obtained, and luminance may be adjusted for each area based on this.

Meanwhile, the above-described area-specific luminance adjustment may be combined with the luminance adjustment (increasing luminance near the boundary portion) based on the distance data DD between the adjacent display devices 10 described above. In this case, the main controller 20 may generate the corrected image signal IS' based on the off-center distance data and the distance data DD.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A tiled display comprising:
   a plurality of display devices respectively including a plurality of pixels; and
   a main controller that processes an input image signal to provide an image signal to the plurality of display devices,
   wherein, based on distance data between adjacent display devices among the plurality of display devices, the main controller generates a corrected image signal that increases luminance near a boundary portion of the adjacent display devices,
   wherein the distance data is based on a distance between adjacent pixels in the adjacent display devices or a distance between outermost portions of the adjacent display devices,
   wherein the main controller generates the corrected image signal when a distance provided by the distance data is within a predetermined value, and generates a normal image signal when the distance provided by the distance data is outside of the predetermined value, and
   wherein even if the distance is within the predetermined value, when a black image is displayed near the boundary portion, the main controller generates a normal image signal.

2. The tiled display of claim 1, wherein
   the distance data is based on a distance between adjacent pixels in the adjacent display devices or a distance between outermost portions of the adjacent display devices.

3. The tiled display of claim 1, wherein
   increasing luminance near the boundary portion includes increasing luminance of one or more pixel rows or pixel columns adjacent to the boundary portion.

4. The tiled display of claim 1, wherein
   increasing luminance near the boundary portion includes gradually increasing luminance of a plurality of pixel rows or pixel columns adjacent to the boundary portion toward the boundary portion.

5. The tiled display of claim 1, further comprising:
   a distance measurer configured to generate distance data between the plurality of display devices to provide the distance data to the main controller.

6. The tiled display of claim 5, wherein
   the distance measurer includes a plurality of sensors respectively disposed in the plurality of display devices.

7. The tiled display of claim 6, wherein
   the plurality of sensors include a main sensor disposed in one of the plurality of display devices and a sub-sensor disposed at remaining display devices of the plurality of display devices, and
   the main sensor measures a distance to the sub-sensor to generate the distance data.

8. The tiled display of claim 6, wherein
   the distance measurer generates off-center distance data between a central display device disposed at a center of the plurality of display devices and display devices surrounding the central display device, and
   the main controller generates the corrected image signal based on the distance data and the off-center distance data.

9. An image correction method of a tiled display including a plurality of display devices, comprising:
   generating distance data between adjacent display devices among the plurality of display devices;
   generating a corrected image signal that increases luminance near a boundary portion of the adjacent display device, based on an input image signal and the distance data; and
   displaying a corrected image with increased luminance near the boundary portion according to the corrected image signal,
   wherein the corrected image signal generates the corrected image signal when a distance provided by the distance data is within a predetermined value, and
   wherein even if the distance is within the predetermined value, when a black image is displayed near the boundary portion, a normal image signal is generated.

10. The image correction method of claim 9, wherein
    the distance data is generated based on a distance between adjacent pixels in the adjacent display devices or a distance between outermost portions of the adjacent display devices.

11. The image correction method of claim 9, wherein
    the displaying of the corrected image includes increasing luminance of one or more pixel rows or pixel columns adjacent to the boundary portion.

12. The image correction method of claim 9, wherein
    the displaying of the corrected image includes gradually increasing luminance of a plurality of pixel rows or pixel columns adjacent to the boundary portion toward the boundary portion.

13. The image correction method of claim 9, wherein
    the generating of the distance data includes measuring a distance between a plurality of sensors respectively disposed in the plurality of display devices.

14. The image correction method of claim 9, wherein
    the generating of the distance data includes measuring a distance between a plurality of sub-sensors disposed in the plurality of display devices and a main sensor disposed outside the tiled display.

15. The image correction method of claim 9, further comprising
    generating off-center distance data between a central display device disposed at a center among a plurality of display devices and display devices surrounding the central display device,
    wherein the corrected image signal is generated based on the input image signal, the distance data, and the off-center distance data.

16. The image correction method of claim 15, wherein
    a corrected image in which luminance near the boundary portion is increased and luminance of a central portion of the tiled display is increased according to the corrected image signal is displayed.

* * * * *